(12) United States Patent
Tanaka et al.

(10) Patent No.: US 6,365,282 B1
(45) Date of Patent: Apr. 2, 2002

(54) RESIN COMPOSITION AND LAMINATED FILM

(75) Inventors: Suminori Tanaka, Kagawa-ken; Toshiaki Shimuzu, Marugame; Toshiki Matsui; Tomoyuki Imai, both of Hiroshima, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/666,560

(22) Filed: Sep. 21, 2000

(30) Foreign Application Priority Data

Sep. 22, 1999 (JP) ............................................. 11-269469
Sep. 22, 1999 (JP) ............................................. 11-269470

(51) Int. Cl.$^7$ ........................ B32B 27/34; B32B 27/30; B32B 27/40; B32B 27/32
(52) U.S. Cl. ................... 428/476.3; 428/477.7; 428/424.2; 428/500
(58) Field of Search ........................... 428/476.3, 477.7, 428/424.2, 500

(56) References Cited

U.S. PATENT DOCUMENTS 5,227,255 A * 7/1993 Akao
5,925,453 A * 7/1999 Kase et al.

* cited by examiner

*Primary Examiner*—Tae H. Yoon
(74) *Attorney, Agent, or Firm*—Nixon & Vanderhye

(57) ABSTRACT

A resin composition comprising (a) 100 parts by weight of a thermoplastic resin containing nitrogen atom(s) in structural units thereof; and (b) 0.1 to 20 parts by weight of an iron compound catalyst comprising at least one iron oxide-based compound selected from the group consisting of iron oxide hydroxide particles or iron oxide particles, which has an average particle size of 0.05 to 2.0 μm; and has a specific oxidation activity.

Such a resin composition is inhibited from generating hydrocyanic acid upon the combustion, though the composition contains nitrogen atom(s) in structural units thereof.

11 Claims, No Drawings

RESIN COMPOSITION AND LAMINATED FILM

BACKGROUND OF THE INVENTION

The present invention relates to a resin composition and a laminated film, and more particularly, to a resin composition and a laminated film (or sheet) comprising the resin composition, which is inhibited from generating hydrocyanic acid upon the combustion.

With the recent rise in levels of living and income, many new goods have been marketed, so that rich material civilization has been realized. On the other hand, the amount of domestic wastes discharged has been rapidly increased. As a result, waste disposal treatments have caused significant social problems.

A considerable part of these wastes is occupied by those derived from synthetic resins. In particular, it has been reported that vinyl chloride resin wastes have a risk of generating dioxins upon incineration thereof. In addition, it has been recognized that synthetic resins containing nitrogen atom(s) in structural units thereof such as polyamide resins or polyurethane resins generate hydrocyanic acid as combustion product gas upon the combustion or incineration as described in Morimoto, "Composition of High-Polymer Combustion Product Gas", HIGH POLYMER, Vol. 22, No. 253, p. 192 (1973). Further, it is also known that laminated films (or sheets) having a constituent layer composed of polyamide resin, which have been extensively used as wrapping materials, also generate hydrocyanic acid upon the combustion or incineration.

Such synthetic resins containing nitrogen atom(s) in structural units thereof have been widely used in ordinary domestic applications such as interior materials, e.g., carpets, curtains, wall papers or decorative papers for decorative sheets. However, hydrocyanic acid generated from these resins upon firing tend to sometimes endanger human life.

As a result of the present inventors' earnest studies for solving the above problems, it has been found that by incorporating an iron compound catalyst comprising iron oxide hydroxide particles or iron oxide particles, which has an average particle size of 0.01 to 2.0 $\mu$m, into a synthetic resin, the obtained resin composition can be inhibited from generating hydrocyanic acid upon the combustion or incineration even though the synthetic resins contain nitrogen atom(s) in structural units thereof. The present invention has been attained on the basis of this finding.

SUMMARY OF THE INVENTION

It is an object of the present invention to provide a resin composition which is free from the generation of hydrocyanic acid upon the combustion or incineration notwithstanding synthetic resins containing nitrogen atom(s) in structural units thereof are used.

It is another object of the present invention to provide a laminated film (or sheet) which is free from the generation of hydrocyanic acid upon the combustion or incineration notwithstanding synthetic resins containing nitrogen atom(s) in structural units thereof are used, and exhibits a sufficient transparency and a good coloring property required for interior materials or wrapping materials.

In a first aspect of the present invention, there is provided a resin composition comprising:

100 parts by weight of a thermoplastic synthetic resin containing nitrogen atom(s) in structural units thereof; and 0.1 to 20 parts by weight of an iron compound catalyst comprising at least one iron oxide-based compound selected from the group consisting of iron oxide hydroxide particles or iron oxide particles, which has an average particle size of 0.05 to 2.0 $\mu$m; and has a catalytic activity capable of converting not less than 15% by mole of carbon monoxide into carbon dioxide when measured under such test conditions that while passing an argon gas as a carrier gas, carbon monoxide supplied in a pulse amount of $6.1 \times 10^{-7}$ mole, is contacted with $2.8 \times 10^{-4}$ mole of iron oxide-based particles obtained by heat-treating said iron compound catalyst at 800° C. for 15 minutes in air (pretreatment), at 250° C. at a space velocity of 42,400 $h^{-1}$ using a pulse catalytic reactor.

In a second aspect of the present invention, there is provided a laminated film comprising:

a synthetic resin layer comprising a synthetic resin containing nitrogen atom(s) in structural units thereof; and a layer comprising a polyolefin-based resin, at least one of the synthetic resin layer comprising a synthetic resin containing nitrogen atom(s) in structural units thereof and polyolefin-based resin layer, which contain an iron compound catalyst comprising at least one iron oxide-based compound selected from the group consisting of iron oxide hydroxide particles or iron oxide particles, which has an average particle size of 0.05 to 2.0 $\mu$m; and has a catalytic activity capable of converting not less than 15% by mole of carbon monoxide into carbon dioxide when measured under the test conditions as set forth above.

In a third aspect of the present invention, there is provided a laminated film comprising:

a synthetic resin layer comprising a synthetic resin containing nitrogen atom(s) in structural units thereof; and a layer of a resin composition comprising 100 parts by weight of a polyolefin-based resin and 0.2 to 20 parts by weight of an iron compound catalyst, which iron compound catalyst comprises at least one iron oxide-based compound selected from the group consisting of iron oxide hydroxide particles or iron oxide particles, which has an average particle size of 0.05 to 2.0 $\mu$m; and has a catalytic activity capable of converting not less than 15% by mole of carbon monoxide into carbon dioxide when measured under the test conditions as set forth above.

In a fourth aspect of the present invention, there is provided a laminated film comprising:

a synthetic resin layer comprising a resin composition comprising 100 parts by weight of a synthetic resin containing nitrogen atom(s) in structural units thereof and 0.2 to 20 parts by weight of an iron compound; and a layer comprising a polyolefin-based resin which iron compound catalyst comprises at least one iron oxide-based compound selected from the group consisting of iron oxide hydroxide particles or iron oxide particles, which has an average particle size of 0.05 to 2.0 $\mu$m; and has a catalytic activity capable of converting not less than 15% by mole of carbon monoxide into carbon dioxide when measured under the test conditions as set forth above.

In a fifth aspect of the present invention, there is provided a laminated film comprising:

a synthetic resin layer comprising a resin composition comprising 100 parts by weight of a synthetic resin containing nitrogen atom(s) in structural units thereof and 0.2 to 20 parts by weight of an iron compound; and a layer of a resin composition comprising 100 parts by weight of a polyolefin-based resin and 0.2 to 20 parts by weight of an iron compound catalyst.

which iron compound catalyst comprises at least one iron oxide-based compound selected from the group consisting of iron oxide hydroxide particles or iron oxide particles, which has an average particle size of 0.05 to 2.0 µm; and has a catalytic activity capable of converting not less than 15% by mole of carbon monoxide into carbon dioxide when measured under the test conditions as set forth above, the total amount of the iron compound catalyst being 0.4 to 20.2 parts by weight based on 100 parts by weight of the synthetic resin containing nitrogen atom(s) in structural units thereof and polyolefin-based resin.

In a sixth aspect of the present invention, there is provided a method of using an iron compound catalyst for inhibiting percentage of the generation of hydrocyanic acid, which iron compound catalyst comprising at least one iron oxide-based compound selected from the group consisting of iron oxide hydroxide particles or iron oxide particles, which has an average particle size of 0.05 to 2.0 µm; and has a catalytic activity capable of converting not less than 15% by mole of carbon monoxide into carbon dioxide when measured under such test conditions that while passing an argon gas as a carrier gas, carbon monoxide supplied in a pulse amount of $6.1 \times 10^{-7}$ mole, is contacted with $2.8 \times 10^{-4}$ mole of iron oxide-based particles obtained by heat-treating said iron compound catalyst at 800° C. for 15 minutes in air (pretreatment), at 250° C. at a space velocity of 42,400 $h^{-1}$ using a pulse catalytic reactor.

DETAILED DESCRIPTION OF THE INVENTION

The resin composition of the present invention is inhibited from generating hydrocyanic acid upon the combustion or incineration notwithstanding the composition comprises a thermoplastic resin containing nitrogen atom(s) in structural units thereof. As the thermoplastic resins containing nitrogen atom(s) in structural units thereof, there may be exemplified polyamides, aromatic polyamides, polyacrylonitrile, polyurethane resins or the like. Meanwhile, the effects of the present invention can be remarkably exhibited when applied to resin compositions comprising such a thermoplastic resin containing nitrogen atom(s) in structural units thereof. However; in the resin composition of the present invention, there may also be contained thermoplastic resins other than those containing nitrogen atom(s) in structural units thereof.

In addition, a laminated film (or sheet) of the present invention comprises:

a synthetic resin layer comprising a synthetic resin containing nitrogen atom(s) in structural units thereof; and a layer comprising a polyolefin-based resin, at least one of the synthetic resin layer comprising a synthetic resin containing nitrogen atom(s) in structural units thereof and polyolefin-based resin layer containing an iron compound catalyst blended therein.

That is, a laminated film (or sheet) of the present invention comprises:

(1) a synthetic resin layer comprising a synthetic resin containing nitrogen atom(s) in structural units thereof, and a layer of a resin composition comprising 100 parts by weight of a polyolefin-based resin and usually 0.2 to 20 parts by weight of an iron compound catalyst;

(2) a synthetic resin layer comprising a resin composition comprising 100 parts by weight of a synthetic resin containing nitrogen atom(s) in structural units thereof and usually 0.2 to 20 parts by weight of an iron compound, and a layer comprising a polyolefin-based resin; or (3) a synthetic resin layer comprising a resin composition comprising 100 parts by weight of a synthetic resin containing nitrogen atom(s) in structural units thereof and usually 0.2 to 20 parts by weight of an iron compound, and a layer of a resin composition comprising 100 parts by weight of a polyolefin-based resin and usually 0.2 to 20 parts by weight of an iron compound catalyst, wherein the total amount of the iron compound catalyst is usually 0.4 to 20.2 parts by weight, preferably 0.4 to 10 parts by weight, more preferably 0.5 to 7 parts by weight based on 100 parts by weight of the sum of the synthetic resin containing nitrogen atom(s) in structural units thereof and polyolefin-based resin.

Further, in the laminated film of the present invention, the iron compound catalyst having the effect of inhibiting the generation of hydrocyanic acid as explained hereinafter is incorporated in the synthetic resin layer containing nitrogen atom(s) in structural units thereof, or in the layer composed mainly of polyolefin-based resins capable of being processed at a relatively low temperature.

In case of the laminated film (or sheet) of the present invention, it is preferred that the iron compound catalyst having the effect of inhibiting the generation of hydrocyanic acid is incorporated in the polyolefin-based resin which can be processed at a relatively low temperature, rather than the synthetic resin containing nitrogen atom(s) in structural units thereof. As compared with the case of using the resin composition comprising a synthetic resin containing nitrogen atom(s) in structural units thereof, and the iron oxide hydroxide particles or iron oxide particles such as magnetite particles, which is required to be processed at a relatively high temperature, such laminated film having the polyolefin-based resin layer containing the iron compound catalyst, can be prevented from being deteriorated in transparency as a whole due to the discoloration of the iron compound catalyst.

The laminated film of the present invention, which is multilayered film having at least two layers, has a total thickness of usually 5 to 1000 µm, preferably 10 to 400 µm. With respect to the respective layers of the laminated film, the synthetic resin layer containing nitrogen atom(s) in structural units thereof has a thickness of usually 1 to 500 µm, preferably 5 to 200 µm, and the polyolefin-based resin layer has a thickness of usually 4 to 500 µm, preferably 5 to 200 µm.

As the synthetic resins containing nitrogen atom(s) in structural units thereof which are usable in the laminated film of the present invention, there may be exemplified polyamide resins such as nylon 6, nylon 66, nylon 6/nylon 66 copolymer, nylon 6/nylon 12 copolymer and nylon 6/nylon 66/nylon 12 copolymer; polyacrylonitrile; (thermoplastic) polyurethane resins; or the like.

As the polyolefin-based resins used in the laminated film of the present invention, there may be exemplified various polyethylenes such as low-density, medium-density or high-density polyethylenes, polypropylene, ethylene-propylene copolymer, polybutene-1, poly(4-methylpentene-1), ethylene-vinyl acetate copolymer, ethylene-methyl methacrylate copolymer, ethylene-methyl acrylate copolymer, ethylene-acrylic acid copolymer, ionic cross-linked olefin copolymer (ionomer) or the like. Among these polyolefin-based resins, the use of those capable of being processed at a relatively low temperature, such as low-density polyethylene, ethylene-vinyl acetate copolymer, is preferred from the standpoint of preventing the discoloration of the iron compound catalyst upon processing.

The iron compound catalyst of the present invention comprises at least one iron oxide-based compound selected from the group consisting of iron oxide particles and iron oxide hydroxide particles having an average particle size (which means a major axial diameter for spindle-shaped or acicular particles; and the average of particle sizes for granular particles) of usually 0.05 to 2.0 μm. Further, the iron compound catalyst of the present invention has such a catalytic activity capable of converting not less than 15% by mole of carbon monoxide into carbon dioxide when measured under the following test conditions.

That is, the catalytic activity (oxidation activity) of the iron compound catalyst is determined as follows. The iron compound catalyst is heat-treated at 800° C. for 15 minutes and then arranged and classified into a particle size of 150 to 200 μm. $2.8 \times 10^{-4}$ mole of the thus obtained particles are charged into a quartz column (diameter: 3 mmφ) of a pulse catalytic reactor used in ordinary catalytic activity tests. While passing an argon gas as a carrier gas through the reactor, $6.1 \times 10^{-7}$ mole of carbon monoxide is introduced from a sample feed port of the reactor and contacted with the iron compound catalyst at a column temperature of 250° C. at a space velocity (SV) of 42,400 h$^{-1}$. The amount of carbon dioxide produced by the oxidation of carbon monoxide and discharged from the column is measured by gas chromatography. The catalytic activity of the iron compound catalyst is evaluated by the conversion percentage of carbon monoxide into carbon dioxide according to the following formula. Incidentally, the space velocity (SV) represents the value obtained by dividing a flow rate of the reaction gas by a volume of the catalyst, and is expressed by a unit of an inverse number of time (h$^{-1}$).

Conversion (%)=[Carbon dioxide produced (mol)]/[Carbon monoxide initially charged (mol)]×100

The reason why the iron compound catalyst is preliminarily heat-treated at 800° C. for 15 minutes before the catalytic activity test, is as follows. That is, wastes are usually incinerated at a temperature of not less than 800° C., so that the iron oxide particles such as magnetite particles and the iron oxide hydroxide particles are expected to undergo phase change at such a high temperature. Therefore, the above heat-treatment is conducted to reproduce the combustion conditions in an actually used incinerator. In addition, the reason why the measuring temperature is set to 250° C., is as follows. That is, when the measuring temperature is as high as more than 300° C., the conversion of carbon monoxide by the iron compound catalyst is increased, so that it becomes difficult to recognize the difference in catalytic activity between the respective catalysts. Meanwhile, it has been confirmed that carbon monoxide cannot be converted into carbon dioxide at 250° C. even in the presence of oxygen unless any oxidation catalyst is used.

As a result of studies concerning interrelation between the carbon monoxide conversion percentage measured by the above method and the generation of hydrocyanic acid when actually combustion or incineration the composition or laminated film of the present invention, it has been found that the amount of hydrocyanic acid generated can be reduced by using the iron compound catalyst showing a carbon monoxide conversion percentage of not less than 15% by mole in a predetermined amount. More specifically, the iron compound catalyst used in the present invention is required to have a catalytic activity capable of converting usually not less than 15% by mole, preferably not less than 18% by mole, more preferably not less than 20% by mole of carbon monoxide into carbon dioxide. Even though a large amount of the iron compound catalyst showing a carbon monoxide conversion percentage of less than 15% by mole, is used, a sufficient combustion-promoting effect may not be obtained, thereby failing to accomplish the objects of the present invention.

Specific examples of the iron oxide particles or iron oxide hydroxide particles usable in the present invention may include the following compounds. As the iron oxide hydroxide particles, there may be used any of goethite (α-FeOOH) particles, lepidocrocite (γ-FeOOH) particles or δ-FeOOH particles. The iron oxide hydroxide particles may have any particle shape such as a spindle shape, an acicular shape, or the like. Among them, the use of spindle-shaped iron oxide hydroxide particles is preferred in view of combustion efficiency.

The spindle-shaped iron oxide hydroxide particles have an appearance of bundles of many superfine fibers when observed by electron microscope. The spindle-shaped iron oxide hydroxide particles have a major axial diameter of usually 0.05 to 1.5 μm, preferably 0.1 to 1.0 μm; an aspect ratio (major axial diameter/minor axial diameter; hereinafter referred to merely as "aspect ratio") of usually 2:1 to 12:1, preferably 3:1 to 10:1; and a BET specific surface area of usually 30 to 250 m$^2$/g, preferably 50 to 150 m$^2$/g.

The acicular iron oxide hydroxide particles may have an acicular shape in appearance, and may further include those acicular particles having dendritic projections on the surface thereof. The acicular iron oxide hydroxide particles have a major axial diameter (corresponding to the average particle size) of usually 0.05 to 2.0 μm, preferably 0.1 to 0.8 μm; an aspect ratio of usually 2:1 to 20:1, preferably 5:1 to 15:1; and a BET specific surface area of usually 10 to 200 m$^2$/g, preferably 15 to 100 m$^2$/g.

These iron oxide hydroxide particles having various shapes may be produced from an aqueous solution prepared by passing an oxygen-containing gas such as air through a suspension containing a precipitate obtained by the neutralization reaction between an aqueous ferrous salt solution and an aqueous alkali solution such as an aqueous alkali hydroxide solution or an aqueous alkali carbonate solution in the presence or absence of additives.

As the iron oxide particles, there may be used any of hematite (α-Fe$_2$O$_3$) particles, magnetite (FeO$_x$·Fe$_2$O$_3$, 0<x≦1) particles and maghemite (γ-Fe$_2$O$_3$) particles. The iron oxide particles may have a spindle shape, an acicular shape, or a substantially isotropic shape, i.e., a so-called granular shape such as a spherical shape, an octahedral shape, a polyhedral shape or an ununiform shape. Among these particles, the use of spindle-shaped iron oxide particles is preferred in view of combustion efficiency.

In general, the spindle-shaped iron oxide particles or acicular iron oxide particles may have a major axial diameter of usually 0.05 to 1.0 μm, preferably 0.05 to 0.3 μm; an aspect ratio of usually 2:1 to 12:1, preferably 3:1 to 10:1; and a BET specific surface area of usually 5 to 200 m$^2$/g, preferably 20 to 100 m$^2$/g.

The ordinary granular iron oxide particles may have an average particle size of usually 0.03 to 1.0 μm, preferably 0.05 to 0.5 μm; and a BET specific surface area of usually 2 to 30 m$^2$/g, preferably 4 to 25 m$^2$/g.

The spindle-shaped or acicular iron oxide particles may be produced by heat-treating the above spindle-shaped or acicular iron oxide hydroxide particles obtained from the above aqueous solution, at a temperature of usually 250 to 700° C. in air while maintaining the particle shape, to form spindle-shaped or acicular hematite particles; heat-reducing the obtained spindle-shaped or acicular hematite particles at a temperature of usually 300 to 500° C. in a reducing atmosphere such as under hydrogen gas flow while maintaining the particle shape, to form spindle-shaped or acicular magnetite particles; and then heat-oxidizing the thus obtained spindle-shaped or acicular magnetite particles at a temperature of usually 200 to 500° C. in air while maintaining the particle shape, thereby forming spindle-shaped or acicular maghemite particles.

The granular iron oxide particles may be produced by passing an oxygen-containing gas such as air through a suspension containing a precipitate obtained by the neutralization reaction between an aqueous ferrous salt solution and an aqueous alkali solution such as an aqueous alkali hydroxide solution or an aqueous alkali carbonate solution to form granular magnetite particles; heat-treating the obtained granular magnetite particles at a temperature of 200 to 500° C. in air while maintaining the particle shape to form granular maghemite particles; and then heat-treating the thus obtained maghemite particles or the previously obtained granular magnetite particles at a temperature of 500 to 900° C. while maintaining the particle shape, thereby forming granular hematite particles.

The iron compound catalyst used in the present invention has a phosphorus content of usually 0.0001 to 0.02% by weight, preferably 0.0001 to 0.01% by weight, more preferably 0.0001 to 0.005% by weight. When the phosphorus content is more than 0.02% by weight, the catalyst poison ability of the phosphorus may become large, so that the oxidation activity for converting carbon monoxide into carbon dioxide may be deteriorated, thereby failing to obtain the aimed effect of inhibiting the generation of hydrocyanic acid upon the combustion or incineration. Meanwhile, although the phosphorus content is preferably as low as possible, it is difficult to industrially produce such an iron compound catalyst having a phosphorus content of less than 0.0001% by weight.

The iron compound catalyst used in the present invention has a sulfur content of usually 0.001 to 0.3% by weight, preferably 0.001 to 0.1% by weight, more preferably 0.001 to 0.07% by weight. When the sulfur content is more than 0.3% by weight, the catalyst poison ability of the sulfur may become large, so that the oxidation activity for converting carbon monoxide into carbon dioxide may be deteriorated, thereby failing to obtain the aimed effect of inhibiting the generation of hydrocyanic acid upon the combustion or incineration. Meanwhile, although the sulfur content is preferably as low as possible, it is difficult to industrially produce such an iron compound catalyst having a sulfur content of less than 0.001% by weight.

The iron compound catalyst used in the present invention has a sodium content of usually 0.001 to 0.3% by weight, preferably 0.001 to 0.2% by weight, more preferably 0.001 to 0.15% by weight. When the sulfur content is more than 0.3% by weight, the catalyst poison ability of the sodium may become large, so that the oxidation activity for converting carbon monoxide into carbon dioxide may be deteriorated, thereby failing to obtain the aimed effect of inhibiting the generation of hydrocyanic acid upon the combustion or incineration. Meanwhile, although the sodium content is preferably as low as possible, it is difficult to industrially produce such an iron compound catalyst having a sodium content of less than 0.001% by weight.

In the production of the iron compound catalyst used in the present invention, it is necessary to restrict the contents of phosphorus, sulfur and sodium as catalyst poisons to not more than predetermined amounts. More specifically, the contents of phosphorus, sulfur and sodium should be reduced by avoiding the use of sodium hexametaphosphate usually added as a sintering preventive upon heat-calcination step, and by removing sulfur ions derived from the raw ferrous materials or sodium ions derived from alkali hydroxides or the alkali carbonates by means of purification treatments such as washing with water or the like.

In the present invention, the iron compound catalyst comprising at least one material appropriately selected from the above iron oxide hydroxide particles or iron oxide particles, which are capable of exhibiting an activity as the above oxidation catalyst.

Also, the iron compound catalyst used in the present invention may be surface-treated with various agents in order to improve a dispersibility in synthetic resins.

The amount of the iron compound catalyst blended in the resin composition of the present invention is usually 0.1 to 20 parts by weight, preferably 0.5 to 10 parts by weight, more preferably 1.0 to 10 parts by weight based on 100 parts by weight of the thermoplastic synthetic resin containing nitrogen atom(s) in structural units thereof. When the content of the iron compound catalyst is less than 0.1 part by weight, it may be difficult to sufficiently accomplish the aimed objects of the present invention. On the contrary, even when the content of the iron compound catalyst is more than 20 parts by weight, the aimed effect cannot be enhanced correspondingly, and there rather arises such a tendency that the obtained resin composition or molded products thereof may suffer from coloring.

The resin composition of the present invention may contain, in addition to the above components, various additives, e.g., anti-blocking agents such as silica or calcium carbonate, lubricants, ultra-violet light absorbers, light stabilizers, anti-oxidants, colorants and plasticizers in ordinary amounts.

The lower limit of the amount of the iron compound catalyst contained in the laminated film of the present invention is usually 0.2% by weight, preferably 0.4% by weight, more preferably 0.5% by weight, still more preferably 1.0% by weight based on the weight of the laminated film. The upper limit of the amount of the iron compound catalyst contained in the laminated film of the present invention is usually 20.2% by weight, preferably 20% by weight, more preferably 10% by weight, still more preferably 7% by weight based on the weight of the laminated film. When the content of the iron compound catalyst is less than 0.2% by weight, it may be difficult to sufficiently accomplish the aimed objects of the present invention. On the contrary, even when the content of the iron compound catalyst is more than 20.2% by weight, the aimed effect may not be enhanced correspondingly, and there rather arises such a tendency that the obtained laminated film suffers from coloring.

Further, the laminated film of the present invention may optionally has a synthetic resin layer having a gas-barrier property which is composed of polyvinyl alcohol or a saponified product of ethylene-vinyl alcohol copolymer; a metal foil layer; a metal-deposited layer or the like. The total thickness of these additional layers is preferably 0.005 to 100 $\mu$m.

The respective layers of the laminated film according to the present invention may contain, in addition to the above-described components, various additives, e.g., anti-blocking agents such as silica or calcium carbonate, lubricants, ultra-violet light absorbers, light stabilizers, anti-oxidants, colorants and plasticizers in ordinary amounts, according to requirements. The amount of the additives added is preferably 0.01 to 30 parts by weight based on 100 parts by weight of the synthetic resins to be added.

The inhibiting percentage of the generation of hydrocyanic acid of the resin composition of the present invention is usually not less than 35%, preferably not less than 40%, more preferably not less than 50%, still more preferably not less than 60%. In addition, the inhibiting percentage of the generation of hydrocyanic acid of the laminated film (or sheet) of the present invention is usually not less than 10%, preferably not less than 12%, more preferably not less than 15%.

The iron compound catalyst used in the present invention can exhibit a specific combustion-promoting effect, resulting in inhibiting the generation of hydrocyanic acid upon the combustion or incineration. The mechanism is suggested as follows though not exactly known.

That is, iron atoms present on the surface of each iron compound catalyst particle are initially kept stable by surface hydroxyl groups capable of dissociating and adsorbing water. When these hydroxyl groups undergo dehydration by the heating in the combustion process, coordination-unsaturated iron ions and oxygen ions are produced. Then, the thus produced coordination-unsaturated active sites can activate oxygen due to the oxygen adsorption thereto caused during the combustion process, and show a good catalytic activity in a series of reaction steps such as dehydrogenation reaction from organic substances or the like, thereby exhibiting a good combustion-promoting effect. By this effect, the synthetic resins containing nitrogen atom(s) in structural units thereof can be decomposed while inhibiting the generation of hydrocyanic acid upon the combustion or incineration.

As described above, the resin composition of the present invention can be inhibited from generating hydrocyanic acid upon the combustion or incineration notwithstanding the composition contains nitrogen atom(s) in structural units thereof. Further, when the resin composition of the present invention are combusted together with other wastes in an incinerator, there can also be obtained such an effect of reducing the amount of dioxins discharged from the incinerator due to the combustion-promoting effect of the iron compound catalyst. Furthermore, the iron compound catalyst can be reacted with heavy metals such as zinc, copper or cadmium which are present in the incinerator, thereby forming ferrite. The thus formed ferrite exhibits a good magnetic property and, therefore, can be easily separated and recovered. The thus recovered material can be recycled and reused in useful applications. As a result, the heavy metals remaining in the incinerator can be prevented from being discharged in the form of water-soluble salts together with residual ashes into environments. The resin composition of the present invention having the above-described advantages can be processed into various molded products, fibers, sheets or the like which are not only free from environmental pollution, but also inhibited from generating hydrocyanic acid upon fire, whereby the risk of endangering human life can be avoided.

The laminated film of the present invention can be inhibited from generating hydrocyanic acid upon the combustion or incineration notwithstanding the resin of the film contains nitrogen atom(s) in structural units thereof. In addition, the laminated film of the present invention can exhibit a sufficient transparency, in case of comprising the synthetic resin containing nitrogen atom(s) in structural units thereof, and the layer of the resin composition comprising the polyolefin-based resin and the iron compound catalyst. Further, since the base material of the laminated film has a sufficient transparency, the obtained laminated film can be suitably colored with pigments or in subsequent printing steps without damaging the aimed effects of the present invention.

Also, when the laminated film of the present invention is combusted together with other wastes in an incinerator, there can be obtained such an effect of reducing the amount of dioxins discharged from the incinerator due to the combustion-promoting effect of the iron compound catalyst contained therein. Upon the incineration, the iron compound catalyst can be reacted with heavy metals such as zinc, copper or cadmium which are present in the incinerator to form ferrite. The thus formed ferrite exhibits a magnetic property and, therefore, can be readily separated and recovered from the incinerator, thereby enabling the recovered material to be recycled for useful applications. Thus, there can also be obtained the effect of inhibiting the heavy metals remaining in the incinerator from being discharged in the form of water-soluble salts together with residual ashes into environments.

Further, when the laminated film (or sheet) of the present invention is used as interior materials such as wall papers and decorative papers for decorative plywood, it is also expected to obtain such an effect of avoiding a risk of endangering human life even upon fire since the generation of hydrocyanic acid is inhibited.

The laminated film (or sheet) having these advantages according to the present invention can be used in various useful applications such as wrapping materials, wall papers or decorative papers for decorative plywood.

EXAMPLES

The present invention is described in more detail by Examples and Comparative Examples, but the Examples are only illustrative and, therefore, not intended to limit the scope of the present invention.

Various properties were measured by the following methods.

Analysis for Hydrocyanic Acid Generated

Twenty milligrams of a sample was charged into a quartz tube-shaped furnace (22 mm$\phi$×300 mm) having a peripheral portion whose temperature was controlled to 700° C. Further, air was fed into the quartz tube from one end thereof at a flow rate of 100 ml/minute. The gas discharged from the other end of the quartz tube was collected into a Tedler bag for 5 minutes. The thus collected gas was measured using a detector (No. 12M, manufactured by GASTEC Co., Ltd.) to determine a concentration of hydrocyanic acid contained therein.

Evaluation of Activity of Iron Compound Catalyst

The iron compound catalyst was heat-treated at 800° C. for 15 minutes, and then granulated and classified into a particle size of 150 to 200 $\mu$m. $2.8 \times 10^{-4}$ mole of the thus obtained particles were filled into a quartz column (diameter: 3 mm$\phi$) of a pulse catalytic reactor. While flowing an argon gas as a carrier gas through the reactor, $6.1 \times 10^{-7}$ mole of carbon monoxide was introduced from a sample feed port of the reactor and contacted with the iron compound catalyst within the column at 250° C. at a space velocity (SV) of 42,400 $h^{-1}$. The amount of carbon dioxide produced by the oxidation of carbon monoxide and discharged from the column was measured by gas chromatography. The catalytic activity of the iron compound catalyst was evaluated by the conversion percentage represented by the above formula.

As the synthetic resins containing nitrogen atom(s) in structural units thereof, there were used the following resins:

Synthetic resin 1: Polyamide (Nylon 6; "ARAMINE CM6041" produced by Toray Co. Ltd.);

Synthetic resin 2: Polyacrylonitrile ("BALEX 1000" produced by Mitsui Kagaku Co., Ltd.);

Synthetic resin 3: Thermoplastic polyurethane elastomer ("MIRACTORANE E885" produced by Nippon Miractorane Co., Ltd.);

Further, as the synthetic resin constituting the laminated film containing nitrogen atom(s) in structural units thereof, there was used Polyamide (Nylon 6, "ARAMINE CM6041" produced by Toray Co., Ltd.).

As the polyolefin-based resin constituting the polyolefin-based resin layer, there was used the following material:

Polyolefin-based resin: low-density polyethylene ("SUMIKASEN L705" produced by Sumitomo Kagaku Co., Ltd.).

As the iron compound catalyst, there was used the following material:

Iron compound catalyst: spindle-shaped goethite (produced by Toda Kogyo Co., Ltd., average particle size: 0.25 µm; BET specific surface area: 86 m$^2$/g; aspect ratio: 8:1; conversion percentage: 23%; phosphorus content: 0.0004% by weight; sulfur content: 0.01% by weight; sodium content: 0.05% by weight).

Comparative Examples 1 to 3

The synthetic resins 1 to 3 was respectively supplied into an extrusion-molding machine equipped with a T-die and extrusion-molded into a film having a thickness of 100 µm. The thus obtained respective films were measured by the above-described method to determine the amount of hydrocyanic acid generated therefrom upon the combustion. The results are shown in Table 1.

Examples 1 to 6

Using a pressure-kneader, the synthetic resins 1 to 3 and the iron compound catalyst were mixed together in amounts as shown in Table 1, heat-melted and then granulated. The thus obtained material was charged into an extrusion-molding machine equipped with a T-die and molded into a film having a thickness of 100 µm. Each of the thus obtained films was measured by the above-described method to determine the amount of hydrocyanic acid generated therefrom upon the combustion. The measurement results of the films were respectively compared with corresponding ones obtained in Comparative Examples 1 to 3 for each kind of synthetic resin used, thereby calculating the efficiency (%) of suppressing the generation of hydrocyanic acid. The results are shown in Table 1.

As is apparent from Table 1, upon the combustion of the films produced from the resin composition of the present invention, the amount of hydrocyanic acid contained in the combustion gas was considerably reduced as compared to those of Comparative Examples using no iron oxide particles.

Comparative Example 4

The same procedure as defined in Example 1 was conducted except that granular hematite (produced by Toda Kogyo Co., Ltd., average particle size: 0.55 µm; BET specific surface area: 2.1 m$^2$/g; phosphorus content: 0.01% by weight; sulfur content: 0.04% by weight; sodium content: 0.18% by weight) having an activity capable of converting 5.3% of carbon monoxide into carbon dioxide, were kneaded with polyamide, and the kneaded material was molded into a film. The obtained film was measured by the same method as defined above to determine the percentage of hydrocyanic acid generated. As a result, it was confirmed that the amount of hydrocyanic acid generated upon the combustion was 1,200 ppm, and the efficiency of suppressing the generation of hydrocyanic acid when compared with Comparative Example 1, was only 8%.

Examples 7 to 10

Using a pressure-kneader, 80 parts by weight of a polyolefin-based rein and 20 parts by weight of the iron compound catalyst were melt-kneaded together and then granulated, thereby obtaining an iron compound catalyst-containing master batch.

The thus obtained iron compound catalyst-containing master batch and a polyolefin-based rein were mixed together, and then charged into a hopper of an extruder. Then, using a extrusion-coating machine, the obtained mixture was extruded over a polyamide film anchor-coated with polyisocyanate-based resin, thereby obtaining a laminated film comprising a polyamide layer and polyolefin-based rein layer containing the iron compound catalyst.

The thickness of the extruded polyolefin-based rein layer formed on the polyamide film and the weight percentage of the iron compound catalyst based on the total weight of the laminated film are shown in Table 2. Meanwhile, it was confirmed that all of the obtained laminated films had a sufficient transparency for practical use.

Comparative Example 5

Low-density polyethylene was extruded over a polyamide film anchor-coated with polyisocyanate-based resin, thereby obtaining a laminated film. The percentage of hydrocyanic acid generated from the thus obtained laminated film upon the combustion was measured by the same method as defined above. The results are shown in Table 2.

As is apparent from Table 2, it was confirmed that when the film was combusted, the amount of hydrocyanic acid contained in the combustion gas was considerably reduced as compared to that of Comparative Example 5 using no iron compound catalyst.

Comparative Example 6

Granular hematite (produced by Toda Kogyo Co., Ltd., average particle size: 0.55 µm; BET specific surface area: 2.1 m$^2$/g; phosphorus content: 0.01% by weight; sulfur content: 0.04% by weight; sodium content: 0.18% by weight) having a catalytic activity capable of converting 5.3% of carbon monoxide into carbon dioxide, and low-density polyethylene were melt-kneaded together and then granulated by the same method as defined above, thereby obtaining a master batch. Then, using the thus obtained master batch, there was produced a laminated film which was identical in layer structure, layer thickness and amount of iron compound catalyst blended to those of the film obtained in Example 9. The obtained laminated film was measured by the same method as defined above to determine the percentage of hydrocyanic acid generated upon the combustion. As a result, it was confirmed that the amount of hydrocyanic acid generated upon the combustion was 300 ppm and, therefore, the efficiency of suppressing the generation of hydrocyanic acid was insufficient.

Example 11

Using a pressure-kneader, 80 parts by weight of a polyamide rein and 20 parts by weight of the iron compound catalyst were melt-kneaded together and then granulated, thereby obtaining an iron compound catalyst-containing master batch.

The thus obtained iron compound catalyst-containing master batch and polyamide were mixed together (the amount of the iron compound catalyst is 10 parts by weight based on 100 parts by weight of polyamide resin), and then charged into a hopper of an extruder. Then, using a extrusion-coating machine, the obtained mixture was extruded over a polyolefin-based rein anchor-coated with polyisocyanate-based resin, thereby obtaining a laminated film comprising polyamide containing the iron compound catalyst and polyisocyanate-based resin layer.

The thickness of the polyolefin-based rein layer and the polyamide resin layer were 50 μm and 15 μm, respectively. The weight percentage of the iron compound catalyst based on the total weight of the laminated film was 1.5% by weight. The amount of hydrocyanic acid generated was 140 ppm. The inhibiting percentage of the generation of hydrocyanic acid was 58%.

Example 12

Using a pressure-kneader, 80 parts by weight of a polyolefin-based rein and 20 parts by weight of the iron compound catalyst were melt-kneaded together and then granulated, thereby obtaining an iron compound catalyst-containing master batch. The thus obtained iron compound catalyst-containing master batch and polyisocyanate-based resin were mixed together (the amount of the iron compound catalyst is 5 parts by weight based on 100 parts by weight of polyisocyanate-based resin), and then charged into a hopper of an extruder.

Alternatively, using a pressure-kneader, 80 parts by weight of a polyamide rein and 20 parts by weight of the iron compound catalyst were melt-kneaded together and then granulated, thereby obtaining an iron compound catalyst-containing master batch. The thus obtained iron compound catalyst-containing master batch and polyamide were mixed together (the amount of the iron compound catalyst is 5 parts by weight based on 100 parts by weight of polyamide resin), and then charged into a hopper of an extruder.

Then, using a extrusion-coating machine, the obtained polyisocyanate-based resin mixture and polyamide rein mixture were coextruded, thereby obtaining a laminated film comprising polyamide containing the iron compound catalyst and polyisocyanate-based resin layer containing the iron compound catalyst.

The thickness of the polyolefin-based rein layer and the polyamide resin layer were 15 μm and 50 μm, respectively. The weight percentage of the iron compound catalyst based on the total weight of the laminated film was 4.8% by weight. The amount of hydrocyanic acid generated was 60 ppm. The inhibiting percentage of the generation of hydrocyanic acid was 82%.

TABLE 1

| Examples and Comparative Examples | Amount blended (wt. part) | | | |
|---|---|---|---|---|
| | Synthetic resin 1 | Synthetic resin 2 | Synthetic resin 3 | Iron compound catalyst |
| Example 1 | 100 | — | — | 1 |
| Example 2 | 100 | — | — | 2 |
| Example 3 | 100 | — | — | 5 |
| Example 4 | 100 | — | — | 10 |
| Example 5 | — | 100 | — | 2 |
| Example 6 | — | — | 100 | 2 |
| Comparative Example 1 | 100 | — | — | — |
| Comparative Example 2 | — | 100 | — | — |
| Comparative Example 3 | — | — | 100 | — |

| Examples and Comparative Examples | Amount of hydrocyanic acid generated (ppm) | Efficiency of suppressing generation of hydrocyanic acid (%) |
|---|---|---|
| Example 1 | 800 | 38 |
| Example 2 | 500 | 62 |
| Example 3 | 200 | 85 |
| Example 4 | 100 | 92 |
| Example 5 | 900 | 61 |
| Example 6 | 50 | 62 |
| Comparative Example 1 | 1,300 | — |
| Comparative Example 2 | 2,300 | — |
| Comparative Example 3 | 130 | — |

TABLE 2

| Examples and Comparative Examples | Polyamide resin layer (μm) | Polyolefin-based resin layer | | |
|---|---|---|---|---|
| | | Polyolefin-based resin (wt. part) | Iron compound catalyst (wt. part) | Thickness (μm) |
| Example 7 | 15 | 100 | 1 | 50 |
| Example 8 | 15 | 100 | 2 | 50 |
| Example 9 | 15 | 100 | 5 | 50 |
| Example 10 | 15 | 100 | 10 | 50 |
| Comparative Example 5 | 15 | 100 | 0 | 50 |

| Examples and Comparative Examples | Percentage of iron compound catalyst based on total weight of film (wt. %) | Amount of hydrocyanic acid generated (ppm) | inhibiting percentage of the generation of hydrocyanic acid (%) |
|---|---|---|---|
| Example 7 | 0.7 | 280 | 15 |
| Example 8 | 1.4 | 180 | 45 |
| Example 9 | 3.5 | 80 | 76 |
| Example 10 | 6.6 | 40 | 88 |
| Comparative Example 5 | 0 | 330 | — |

What is claimed is:

1. A laminated film comprising:
   a synthetic resin layer comprising a synthetic resin containing nitrogen atom(s) in structural units thereof; and
   a layer comprising a polyolefin-based resin,
   at least one of the synthetic resin layer comprising a synthetic resin containing nitrogen atom(s) in structural units thereof and polyolefin-based resin layer containing an iron compound catalyst having a phosphorus content of 0.0001 to 0.02% by weight, a sulfur content of 0.001 to 0.3% by weight and a sodium content of 0.001 to 0.3% by weight, comprising at least one iron oxide-based compound selected from the group consisting of iron oxide hydroxide particles or iron oxide particles, which has an average particle size of 0.05 to 2.0 μm; and has a catalytic activity capable of converting not less than 15% by mole of carbon monoxide into carbon dioxide when measured under the test conditions such that while passing an argon gas as a carrier gas, carbon monoxide supplied in a pulse amount of $6.1 \times 10-7$ mole, is contacted with $2.8 \times 10-4$ mole of iron oxide-based particles obtained by heat-treating said iron compound catalyst at 800° C. for 15 minutes in air (pretreatment), at 250° C. at a space velocity of 42,400 h−1 using a pulse catalytic reactor.

2. A laminated film according to claim 1 comprising:

the synthetic resin layer comprising a synthetic resin containing nitrogen atom(s) in structural units thereof; and a layer of a resin composition comprising 100 parts by weight of the polyolefin-based resin and 0.2 to 20 parts by weight of the iron compound catalyst.

3. A laminated film according to claim 1 comprising:

a synthetic resin layer comprising a resin composition comprising 100 parts by weight of the synthetic resin containing nitrogen atom(s) in structural units thereof and 0.2 to 20 parts by weight of the iron compound catalyst; and the layer comprising the polyolefin-based resin.

4. A laminated film according to claim 1 comprising:

a synthetic resin layer comprising a resin composition comprising 100 parts by weight of the synthetic resin containing nitrogen atom(s) in structural units thereof and 0.2 to 20 parts by weight of the iron compound; and a layer of a resin composition comprising 100 parts by weight of the polyolefin-based resin and 0.2 to 20 parts by weight of the iron compound catalyst, wherein the total amount of the iron compound catalyst is 0.4 to 20.2 parts by weight based on 100 parts by weight of the synthetic resin containing nitrogen atom(s) in structural units thereof and polyolefin-based resin.

5. A laminated film according to claim 1, wherein said iron compound catalyst comprises spindle-shaped iron oxide hydroxide particles having a major axial diameter of 0.05 to 1.5 $\mu$m, an aspect ratio of 2:1 to 18:1 and a BET specific surface area of 30 to 250 $m^2/g$.

6. A laminated film according to claim 1, wherein said iron compound catalyst comprises acicular iron oxide hydroxide particles having a major axial diameter of 0.05 to 2.0 $\mu$m, an aspect ratio of 2:1 to 20:1 and a BET specific surface area of 10 to 100 $m^2/g$.

7. A laminated film according to claim 1, wherein said iron compound catalyst comprises spindle-shaped iron oxide particles or acicular iron oxide particles having a major axial diameter of 0.05 to 1.0 $\mu$m, an aspect ratio of 2:1 to 12:1 and a BET specific surface area of 30 to 200 $m^2/g$.

8. A laminated film according to claim 1, wherein said iron compound catalyst comprises at least one material selected from the group consisting of goethite particles, akaganeite particles, lepidocrocite particles, hematite particles, maghemite particles and magnetite particles.

9. A laminated film according to claim 1, wherein said thermoplastic synthetic resin containing nitrogen atom(s) in structural units thereof is polyamide resin, aromatic polyamide resin, polyacrylonitrile resin or polyurethane resin.

10. A laminated film according to claim 1, wherein said polyolefin-based resin is polyethylene, polypropylene, ethylene-propylene copolymer, polybutene-1, poly(4-methylpentene-1), ethylene-vinyl acetate copolymer, ethylene-methyl methacrylate copolymer, ethylene-methyl acrylate copolymer, ethylene-acrylic acid copolymer or ionic cross-linked olefin copolymer.

11. A laminated film according to claim 1, wherein the thickness of said laminated film is 5 to 1000 $\mu$m, the thickness of said synthetic resin layer comprising the synthetic resin containing nitrogen atom(s) in structural units thereof is 1 to 500 $\mu$m, and the thickness of said polyolefin-based resin layer is 4 to 500 $\mu$m.

* * * * *